United States Patent

Fikes et al.

[11] Patent Number: 5,914,479
[45] Date of Patent: Jun. 22, 1999

[54] COUNTER-ROTATING SCANNER

[75] Inventors: Joseph F. Fikes; Larry M. Foster, both of Huntsville; Franklin H. Perkins, Somerville; James M. Stanfield, Brownsboro; Robert J. Berinato, Huntsville, all of Ala.

[73] Assignee: Dynetics, Inc., Huntsville, Ala.

[21] Appl. No.: 08/760,072

[22] Filed: Dec. 4, 1996

Related U.S. Application Data

[60] Provisional application No. 60/025,745, Sep. 20, 1996.
[51] Int. Cl.$^6$ ..................................................... G06K 7/10
[52] U.S. Cl. ................... 235/467; 235/454; 235/462.38; 235/462.36; 235/462.37; 235/462.43
[58] Field of Search ..................................... 235/467, 454, 235/472, 462; 359/209, 210, 212, 221, 223, 226, 462.38, 462.36, 462.37, 462.43

[56] References Cited

U.S. PATENT DOCUMENTS

| | | | |
|---|---|---|---|
| 4,454,610 | 6/1984 | Sziklai | 382/3 |
| 4,550,985 | 11/1985 | Hayashi | 359/209 |
| 4,621,893 | 11/1986 | Lohmann | 350/6.5 |
| 4,967,076 | 10/1990 | Schuhmacher et al. | 250/236 |
| 5,052,800 | 10/1991 | Mimmack et al. | 356/152 |
| 5,149,949 | 9/1992 | Wike, Jr. | 235/467 |
| 5,367,399 | 11/1994 | Kramer | 359/212 |
| 5,422,471 | 6/1995 | Plesko | 235/467 |
| 5,559,320 | 9/1996 | Loya | 235/467 |
| 5,581,533 | 12/1996 | Fujisawa | 369/112 |
| 5,600,120 | 2/1997 | Peng | 235/467 |
| 5,663,550 | 9/1997 | Peng | 235/467 |
| 5,705,805 | 1/1998 | Han | 250/204.1 |
| 5,721,585 | 2/1998 | Keast et al. | 348/36 |

*Primary Examiner*—Anita Pellman Gross
*Assistant Examiner*—Douglas X. Rodriguez
*Attorney, Agent, or Firm*—Needle & Rosenberg, P.C.

[57] ABSTRACT

A scanner and a method for scanning a beam along a path employs a housing tint defines a first cylindrical cavity. A ring gear is disposed within the cylindrical cavity and affixed to the housing. A beam is generated from a fixed location relative to the housing. A drive disk is disposed within the first cylindrical cavity. The drive disk defines a second cylindrical cavity and has a first axis of rotation. The drive disk defines a first channel in communication with the beam. The first channel has a first proximal end pivotally rotatable about an axis adjacent the fixed location. A scan disk is disposed within the second cylindrical cavity and has a second axis of rotation offset from the first axis of rotation. The scan disk defines a second channel. The second channel has a second proximal end in communication with the first distal opening. The second proximal end pivotally rotates about an axis adjacent the first distal end. A ring motor causes the drive disk to rotate about the first axis in a first direction. A spur gear, affixed to the scan disk, engages the ring gear so that as the drive disk rotates in the first direction, the spur gear is displaced along the ring gear thus causing the scan disk to rotate in a second direction opposite the first direction causing the second distal end to reciprocate. The beam is coupled through the first channel and the second channel and out of the second distal opening toward the path, thereby causing the beam to scan along the path as the second distal end reciprocates.

25 Claims, 5 Drawing Sheets

COUNTER-ROTATING SCANNER

REFERENCE TO A PROVISIONAL APPLICATION

This application for letters patent claims priority under 35 U.S.C. § 119(e) on a provisional patent application, Ser. No. 60/025,745, filed on Sep. 20, 1996.

BACKGROUND OF THE INVENTION

1. Field of the Invention

The present invention relates to devices for scanning and, more specifically, to devices for optical scanning along a substantially linear path.

2. Description of the Prior Art

Devices for scanning beams of light have long been known to the art. Optical scanning is used in a variety of applications, including writing and reading data to and from such storage media as compact discs and optical data cards. Optical data cards, and other types of linear-track optical data storage media, store data along linear tracks. Scanning such tracks requires linear translation of either the data card or the device used to scan the data card. Current devices include mechanical systems, electronic systems, acousto-optical systems, electro-optical systems, and other systems for moving an optical beam along a path. Most mechanical devices employ rotating polygon mirrors or prisms, galvanometer actuators carrying mirrors, and similar devices.

In the case of linear-track optical data storage media, current scanning devices incorporate Optical Pickup Units (OPU) which reciprocate relative to a data storage medium from the beginning to the end of the data track. The OPUs are typically mounted on a carriage assembly which is constrained to move in a straight line parallel to a data track. A linear actuator imparts a force on the carriage assembly to effect the linear motion and linear position transducer determines instantaneous OPU location and provides feedback for the velocity control function on of the actuator. During a typical data scan, the OPU translates down the track, illuminating the data spots on the track with an optical beam and receives reflected signals by means of electro-optical components. Current devices require acceleration of the OPU to its operating speed at the beginning of each data track scan and deceleration of the OPU to a stop at the end of each data track. This motion is then repeated in each direction.

Such back and forth motion of the OPU and carriage assembly results in undesirable acceleration and deceleration of the OPU and vibration and ultimately limits the operating speed of the device. Scan speed may be increased by decreasing the mass and friction associated with the OPU and carriage assembly or by increasing the force provided by the actuator.

In addition to translating back and forth down the data tracks to read and write optical data, the OPU must provide small amplitude, high speed focus and cross-track motions. This is because the data spot size is on the order of a single micrometer diameter and the track-to-track spacing is typically on the order of ten micrometers. As the OPU scans along the data track, small imperfections in any realizable mechanical mechanism result in tiny motions perpendicular to the data track, and therefore failure to maintain the required alignment between the optical data and the OPU. To compensate for misalignment caused by these undesirable motion, current design practices incorporate high speed actuators as part of the objective lens mounting assembly to deflect the beam in the cross track direction (perpendicular to the data track in the plan of the optical medium) and also in the "focus" direction (perpendicular to the data track, normal to the optical medium). Since the actuators only move the objective lens (whose mass can be made relatively small), high speed compensation of small tracking and focus errors may be realized. Tracking and focus error signals which drive the compensator actuators are usually developed by auxiliary optical and electronic components within the OPU.

Other mechanical means for optical scanning, such as spinning polygon mirrors or galvanometer driven mirrors, are common in other applications, but are not used in scanning optical storage media for two reasons. First, they scan a focused beam onto a curved (cylindrical) surface. If the curvature is compensated by optical elements, neither the data track illumination nor subsequent reflection is normal to the planar surface of the storage medium. Optical data storage media ordinarily require the illuminating beam to be focused to a small spot and require it to strike the surface of the medium at substantially perpendicular incidence. The resulting reflection also propagates perpendicularly bact from the surface through the same optical train as the illuminating beam. One method attempts to circumvent this problem by deforming the card to conform to a cylindrical surface. The focused illumination spot follows a circle which is supposed to be coincident with a data track on the surface of the deformed card. However, the card must be bent in such a way that its surface is accurately coincident with the required cylindrical surface to within a few micrometers (otherwise the fast focus compensation mechanism will be unable to maintain acceptable focus as the spot moves along the data track). Such an approach has two disadvantages. First, considering the relatively simple and inexpensive procedures and materials used in manufacturing optical memory cards (OMCs), it is hard to achieve necessary accuracy when the card is bent. Second, deforming the card may result in excessive wear on the card and may also introduce birefringence in the transparent protective covering of the data card with undesirable effects on the polarization state of the illumination and reflected beams.

An advantage of the present invention is that it does not require reciprocating components. Thus, it reduces drive power, reduces vibration and it offers the potential for increased speed.

A further advantage of the invention is that it maintains the scan beam direction perpendicular to the surface of the object being scanned.

A further advantage of the invention is that the OPU remains essentially stationary, thereby reducing vibration, drive power and design complexity.

SUMMARY OF THE INVENTION

The disadvantages of the prior art are overcome by the present invention which employs counter-rotating optical periscopes to achieve linear scanning using only fixed and constantly rotating components, thereby eliminating the requirement to accelerate and decelerate a mass.

Optical periscopes ordinarily incorporate a pair of reflective surfaces which are parallel to one another, each of which deviates an incident beam by an angle of 90 degrees from its propagation direction. Other deviation angles may also be used if they impart a perpendicular component to the beam's propagation direction and if the combined effect of the reflective surfaces results in a beam parallel to the incoming beam. If a periscope is caused to rotate in such a way that the input beam is coincident with the axis of rotation, then the output axis will always remain parallel to the input axis, but its displacement will fall upon a circle centered on the axis of rotation.

If a second periscope is joined with the first so that the output of the first periscope serves as the input to the second, the displacement of the output of the second periscope from the input to the first periscope can be represented mathematically as the vector sum of the displacement due to the first periscope and the displacement due to the second. The resultant displacement is a function of the displacements of each periscope and their orientation angles. In the special case where the periscopes are of equal length, and the angular measures of their orientations are constrained to be opposite one another, and the input to the second periscope is constrained to be aligned with the output of the first periscope, then as the two periscopes rotate synchronously (with angle of the same absolute magnitude, but opposite sense), the resultant displacement traces out a perfectly straight line. Two continuously rotating periscopes thus achieve the same effect as a start/stop linear scanner, and if they are implemented with proper consideration to static and dynamic balance, they can operate with little vibration and no requirement for acceleration or deceleration along data tracks.

To scan a set of parallel data tracks, a separate mechanism must provide relative motion between the linear scanner and the collection of data tracks. The track-to-track motion, however, occurs much more slowly than the scan along the data track, and can easily be implemented via any of a number of well known translation devices, such as stepping devices and constant velocity phased devices with the along-track scanning.

In one aspect, the invention is an apparatus for scanning a beam along a path on an object. The apparatus employs a first channel and a second channel. The first optical channel has a first proximal end and an opposite first distal end. The first proximal end is in optical communication with the optical beam and the first proximal end is pivotally rotatable about a first axis adjacent the fixed point. The second channel has a second proximal end and an opposite second distal end with the second proximal end in communication with the first distal end of the first channel. The second proximal end is pivotally rotatable about a second axis adjacent the first distal end of the first channel. A drive causes the first channel to rotate about the first axis in a first direction, which causes the second channel to rotate about the second axis in a second direction opposite the first direction. Optical or other focusing devices couple the beam through the first channel and the second channel out of the second distal end of the second channel toward the object. As the first channel rotates in the first direction and the second channel rotates in the second direction, the second distal end of the second channel reciprocates, thereby causing the beam to scan along the linear path on the object.

Another aspect of the invention is an optical image scanner for scanning an optical beam along a linear path on an object. The scanner employs a housing having a top and an opposite bottom. The housing defines a first cylindrical cavity between the top and the bottom with a ring gear disposed within the cylindrical cavity and affixed to the housing. A light source generates an optical beam from a fixed point relative to the housing. A drive disk, having a peripheral edge, is disposed within the first cylindrical cavity and defining a second cylindrical cavity. The drive disk has a first axis of rotation and defines a first optical channel having a first length, a first proximal end and a first distal end. The drive disk also defines a first proximal opening adjacent the first proximal end of the first optical channel, through which the first optical channel is in optical communication with the optical beam, and a first distal opening, adjacent the first distal end of the first optical channel and in optical communication with the first optical channel. The first proximal end of the first optical channel is pivotally rotatable about a first axis adjacent the fixed point.

A scan disk, disposed within the second cylindrical cavity and having a second axis of rotation offset from the first axis of rotation, defines a second optical channel having a second length substantially equal to the first length, a second proximal end and a second distal end. The scan disk also defines a second proximal opening adjacent the second proximal end of the second optical channel, through which the second optical channel is in optical communication with the first distal opening, and a second distal opening, adjacent the second distal end of the second optical channel and in optical communication with the second optical channel. The second proximal end of the second optical channel is pivotally rotatable about a second axis adjacent the first distal end of the first optical channel.

A ring motor is coupled to the peripheral edge and causes the drive disk to rotate about the first axis of rotation in a first direction at a first rotational speed. A spur gear is circumferentially affixed to the scan disk and engaged with the ring gear so that as the ring motor causes the drive disk to rotate in the first direction, the spur gear is displaced along the ring gear thus causing the scan disk to rotate about the second axis in a second direction opposite the first direction at a second rotational speed substantially equal to the first rotational speed. Optical devices optically couple the beam from the generating means through the first optical channel and the second optical channel and out of the second distal opening toward the linear path. Thus, as the first optical channel rotates in the first direction and the second optical channel rotates in the second direction, the second distal end of the second optical channel linearly reciprocates, thereby causing the beam to scan along the linear path on the object.

Yet another aspect of the invention is a method of scanning an optical beam along a linear path. The optical beam is generated from a fixed point. The beam is directed through a first optical channel having a first proximal end adjacent the fixed point and an opposite first distal end so that the beam propagates from the first proximal end of the first optical channel toward the first distal end of the first optical channel. The beam is then directed from the first distal end of the first optical channel through a second optical channel having a second proximal end adjacent the first distal end of the first optical channel and an opposite second distal end so that the beam propagates from the second proximal end of the second optical channel toward the second distal end of the second optical channel. The first optical channel is caused to rotate about the first proximal end of the first optical channel in a first direction on a primary plane. The second optical channel is caused to rotate about the second proximal end of the second optical channel in a second direction opposite the first direction on a secondary plane parallel to the primary plane. The beam is directed from the second distal end of the second optical channel toward the linear path. Thus, as the first optical channel rotates in the first direction and the second optical channel rotates in the second direction, the beam linearly reciprocates, thereby causing the beam to scan along the linear path on the object.

In all of these aspects, the sensor (which may include a light source and a detector) and the object being scanned are stationary while the rotating components translate the optical beam down a linear path. It appears to the sensor that the object is moving linearly, while in reality neither the sensor nor the object moves. Also, the scanned beam remains substantially perpendicular to the surface being scanned and the optical path length within the apparatus remains substantially constant throughout a scan cycle.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1A:
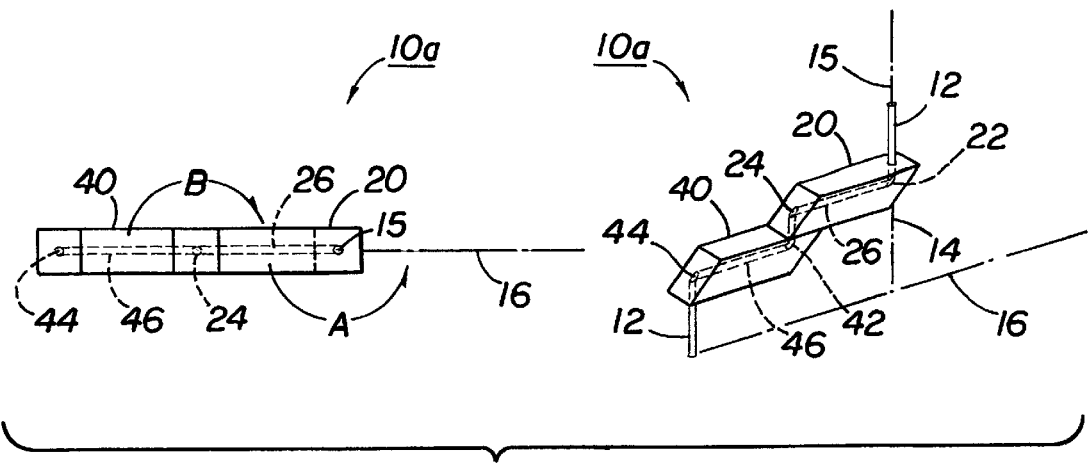
FIGS. 1A–1F are schematic views of a simple embodiment of the invention at various stages of a linear scan, each schematic view being paired with a corresponding perspective drawing of the embodiment.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: "a," "an," and "the" includes plural reference, "in" includes "in" and "on;" "optical" includes reference to any wave length of electromagnetic radiation and is not limited by wave lengths in the visible spectrum; "channel" includes any predetermined path that allows propagation of a beam along at least a portion of its length, "communication" means a relationship between at least two objects that allows propagation of a beam from a first object to at least a second object.

As shown in FIGS. 1A–1F, the present invention is an apparatus 10 for scanning an optical beam 12 along a substantially linear path 16. The apparatus 10 comprises a first optical channel 26, which may be defined by a first periscope 20 or other elongated member, and a second optical channel 46 which may be enclosed in a second periscope 40 or other elongated member.

The first optical channel 26 has a first proximal end 22 and an opposite first distal end 24, the first proximal end being in optical communication with the optical beam, the first proximal end being pivotally rotatable about a first axis 14 intersecting a fixed point 15. The second optical channel 46 has a second proximal end 42 and an opposite second distal end 44. The second proximal end 42 is in optical communication with the first distal end 24 of the first optical channel 26 and the second proximal end 42 is pivotally rotatable about a second axis adjacent the first distal end 24 of the first optical channel 26. The first optical channel 26 rotates about the first axis in a first direction, the direction of arrow A and the second optical channel 46 rotates about the second axis in a second direction opposite the first direction, the direction of arrow B. The beam 12 is optically coupled through the first optical channel 26 and the second optical channel 46 out of the second distal end 44 toward the linear path 16. If the lengths of the optical channels 26, 46 are substantially the same and if the magnitudes of angular velocity in directions A and B are substantially the same, then as the first optical channel 26 rotates in the first direction A and the second optical channel 46 rotates in the second direction B, the second distal end 44 of the second optical channel 26 linearly reciprocates, thereby causing the beam to scan along a linear path 16 on the object.

Figure 1B:
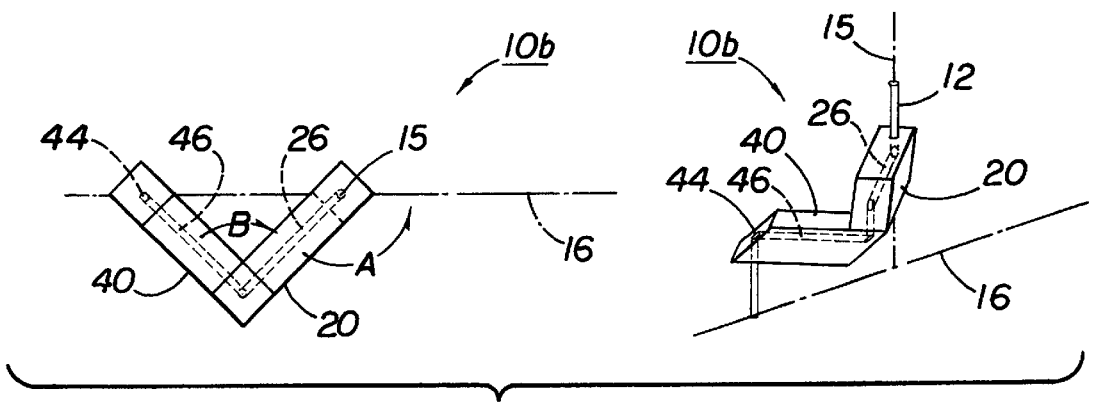
Figure 1C:
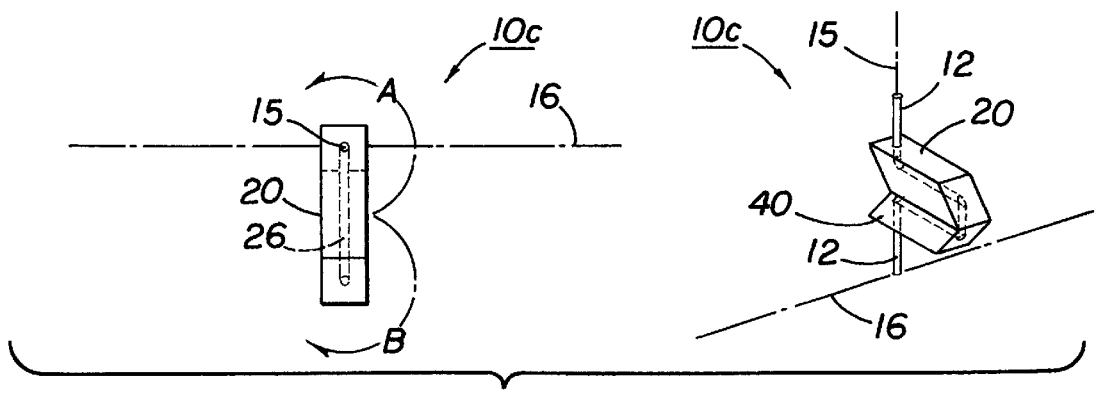
Figure 1D:
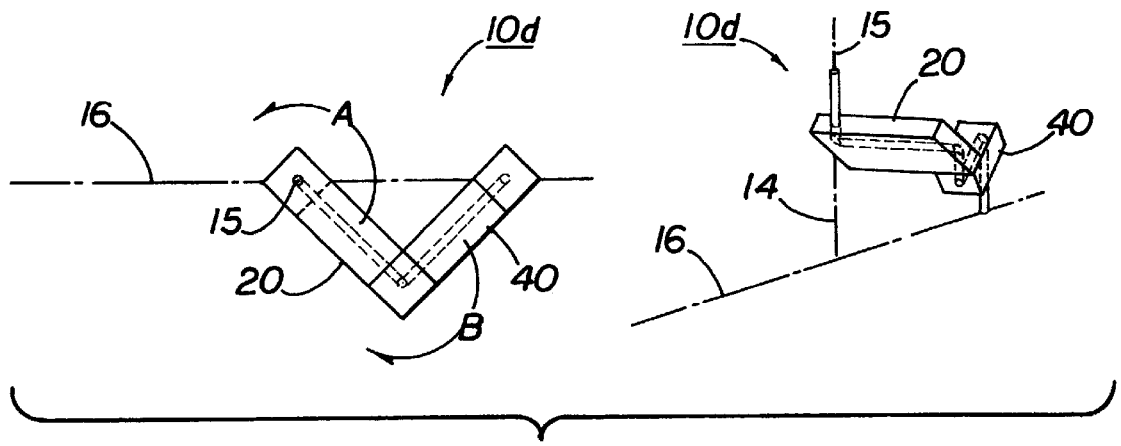
Figure 1E:
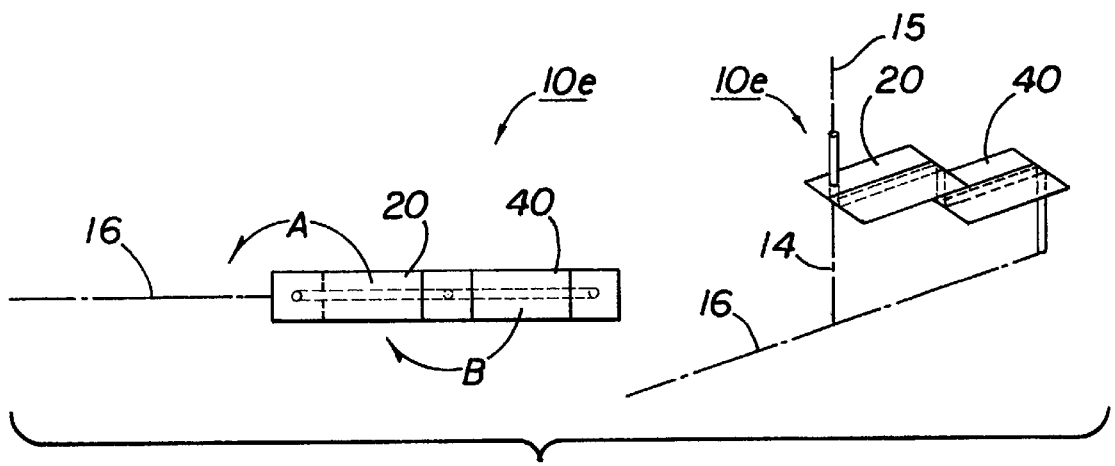
Figure 1F:
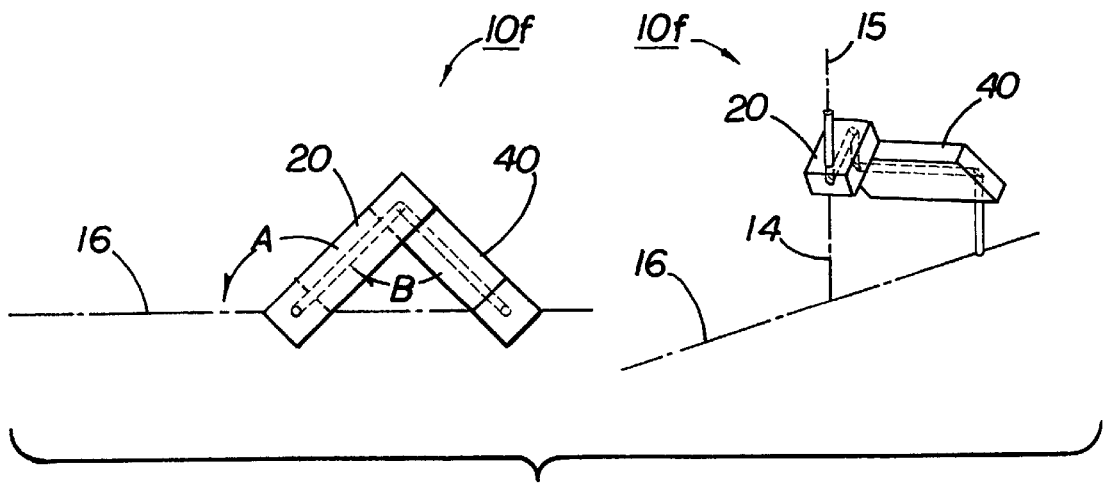

FIGS. 1A–1F show the apparatus 10a–f at various stages of a scan. FIG. 1A shows the apparatus 10a fully extended to the left. FIG. 1B shows the apparatus 1b as the second distal end 44 tends inward. FIG. 1C shows the second distal end 44 substantially aligned with the first proximal end 22. FIG. 1D shows the second distal end 44 to the right of the first proximal end 22. FIG. 1E shows the second distal end 44 fully extended to the right of the first proximal end 22 and FIG. 1F shows the second distal end 44 tending back toward the first proximal end 22.

This embodiment may employ optical periscopes comprising rhomboidal prisms. An important property of optical periscopes implemented by means of rhomboidal prisms is the relative insensitivity of the amount of beam displacement and final beam direction to angular misalignment of the periscopes. The 45 degree faces of rhomboidal prisms are routinely fabricated to an accuracy of about one minute of arc, and with greater care may be fabricated to an accuracy approaching one arc second. In the beam scanning application it is also important that the length of the two rhomboidal prisms (i.e., the spacing between the two 45 degree faces) be precisely equal as well, and that is a difficult parameter to control in an absolute sense. Such prisms may be fabricated by making a single prism whose width is somewhat greater than twice that required for the individual periscope prisms. Upon completing fabrication of the over-wide prism, it is simply sectioned into two prisms, which because of their common origin, are of precisely equal lengths.

One disadvantage of this approach regarding the transfer of images through the scanner is a relatively poor trade-off between F-number of imaging optics (the ratio of focal length to entrance aperture diameter), periscope cross-sectional size, and periscope length. Electromagnetic wave theory requires that the minimum achievable spot resolution be approximately the wavelength multiplied by the F-number. Resolution of the small spots used in optical data storage therefore requires both a relatively short wavelength (typically less than one micrometer) as well as a low F-number (on the order of 1.0). For this direct approach, F-numbers smaller than about 8.0 would require an inordinately large periscope cross section for a given periscope length. Packaging problems and other mechanical difficulties become manifest at smaller F-numbers for this approach for certain applications.

Including one or more relaying lenses allows the ratio of optical channel cross section to length to be greatly reduced for a given system F-number, or conversely, the F-number can be reduced (for finer resolution) while maintaining a practical optical channel cross section to length ratio. The effect of image relaying is to transfer an optical image between the linear path and the OPU so that it appears to the OPU that the linear path is in its conventional read/write position. That is, the image relaying optical system transforms a complex irradiance distribution from one plane at a particular location (the data irradiance distribution on the linear path) to another similar distribution in another plane at a different location (the image of the data irradiance distribution as seen from the OPU). From its stationary location, it appears to the OPU that data on the surface of the card is moving by just as though the OPU itself were translating along a stationary linear path, albeit at a nonlinear (sinusoidal) rate. In addition to the obvious benefit of eliminating reciprocating components, the approach encourages the use of existing OPUs which are well developed, and which incorporate fine focus and track capability. Since the image seen by the OPU is in every way a faithful replica of what would be seen by an OPU translating along a linear path, existing methods of fine focus and track designed into the OPU can be used with little or no modification.

Figure 2:
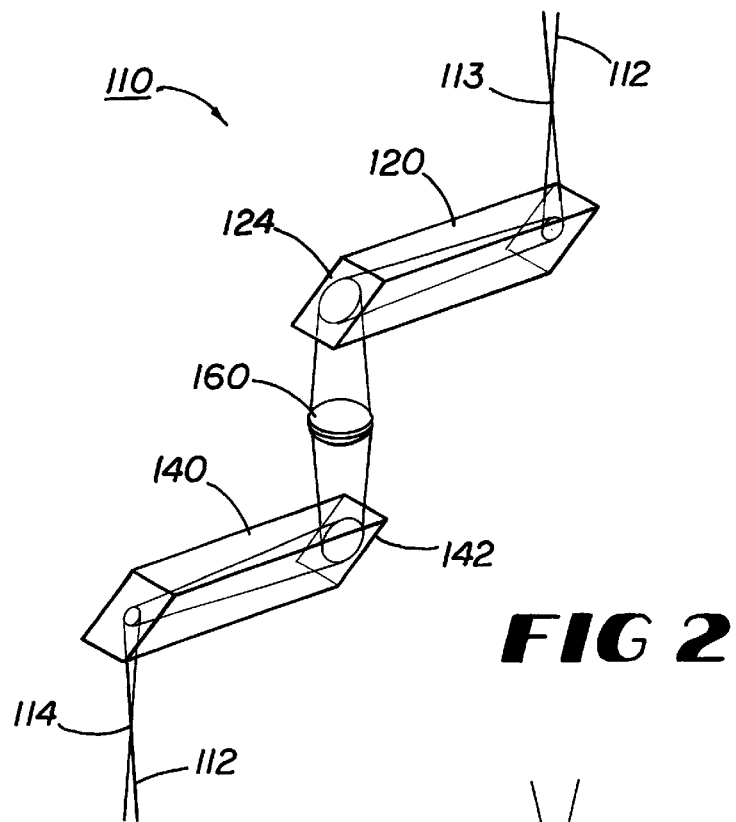
FIG. 2 is an exploded perspective view of an embodiment of the invention employing a relay lens disposed between two periscopes.

FIG. 2 shows an embodiment 110 of the invention in which an image 112 may be relayed through the scanner by a single relay lens 160 disposed between the first distal end 124 of the first optical channel 120 and the second proximal end 142 of the second optical channel 140. The focal length of the lens 160 is chosen to be one fourth of the optical path length between the foci 113, 114 of the beam 112. This meets a standard 1:1 imaging requirement wherein both the object and the image are located on opposite sides of a converging lens at twice the lens focal length. In this embodiment, light is uncollimated throughout the entire scanner system.

Figure 3:
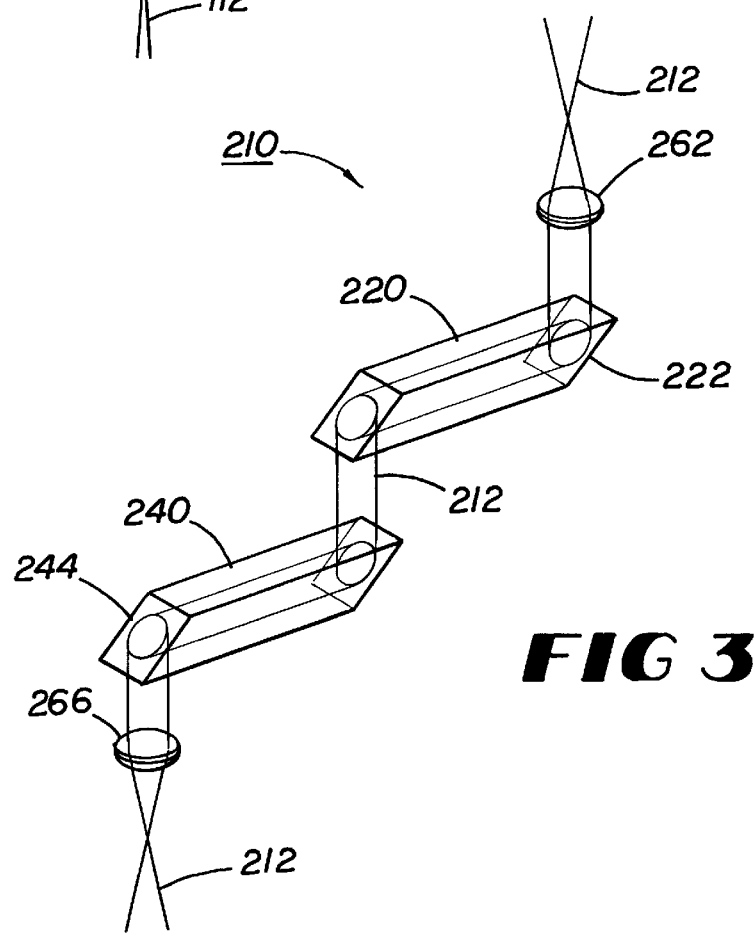
FIG. 3 is an exploded perspective view of an embodiment of the invention employing collimating lenses at the input and output of the apparatus.

FIG. 3 shows an embodiment 210 employing a first lens 262 disposed adjacent the first proximal end 222 of the first optical channel 220 for collimating the beam 212 into the first optical channel 220 and a second lens 266 disposed adjacent the second distal end 244 of the second optical channel 240 for focusing the beam 212. This embodiment 210 offers the advantage of decreased optical beam diameter within the scanner. By choosing different focal lengths for the lenses 262, 266, the image may be magnified or reduced.

This embodiment provides at least two advantages: first, it promotes the use of low F-number systems (thereby enhancing optical resolution) without requiring the large diameter optical channels; and second, it provides an opportunity to match the F-number of an existing OPU to an optical storage medium for which it was not designed. The latter may be an important consideration where it is desirable to use an OPU designed for a spot size which is different from that of the particular medium being used.

The beam 212 emerges from an optical pick-up objective as a converging cone of light and comes to a focus at the point where an object would ordinarily be located. In this embodiment, the illumination continues beyond that point as a diverging cone of light to where it meets the input lens 262 to the scanner. The input lens is located one focal length away from the focal plane of the OPU, and it therefore collimates the illumination from the OPU before passing it to the rotating channels 220, 240. At the output of the scanner the illumination passes through another lens 266 which refocuses the collimated illumination onto the object. The reflection from the object is an image of the illuminated data which then propagates backward through the lenses and prisms in exactly the same way as the forward beam.

Figure 4:
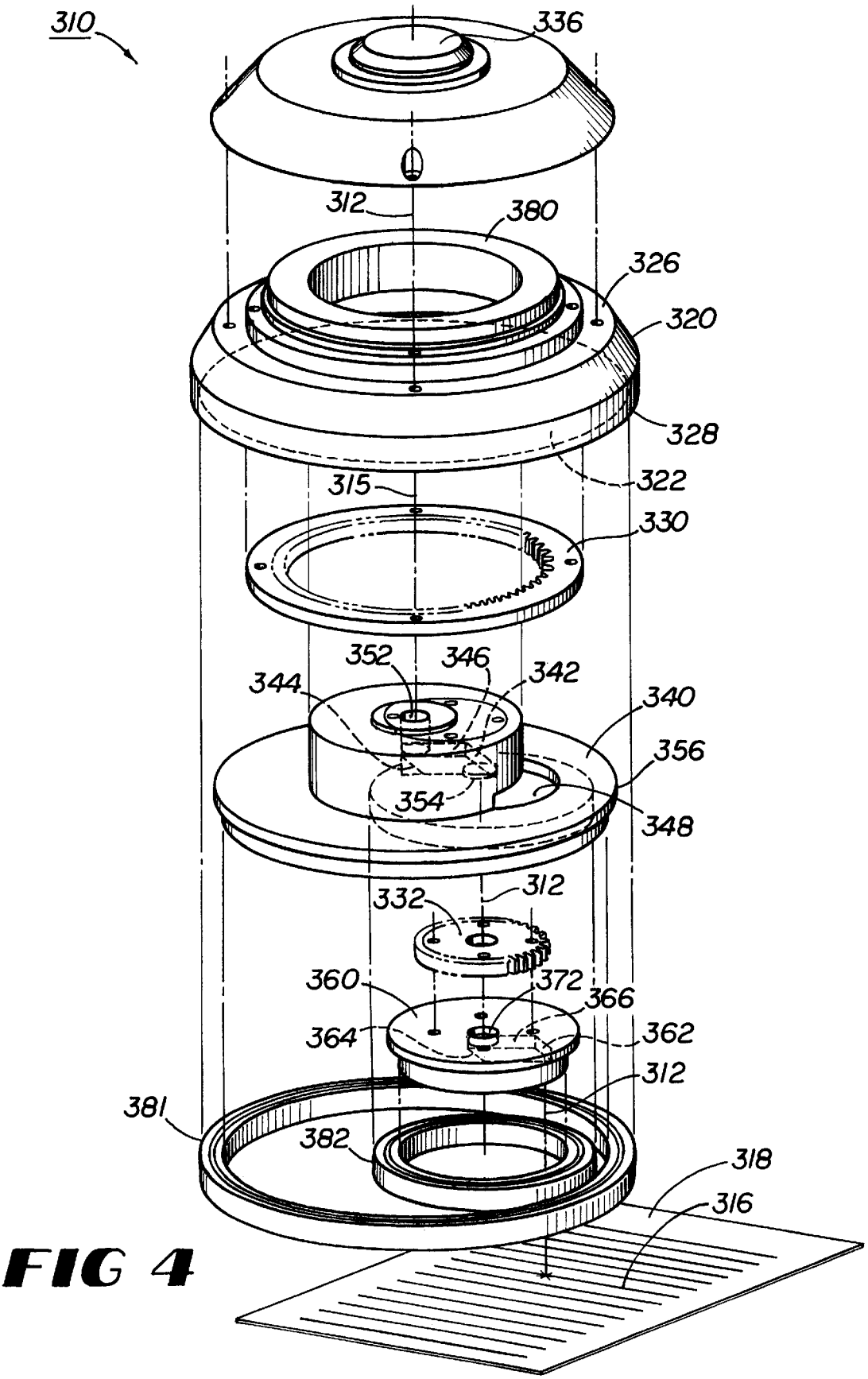
FIG. 4 is an exploded isometric view of an embodiment of the invention in which the optical channels are embedded in disks.
Figure 5:
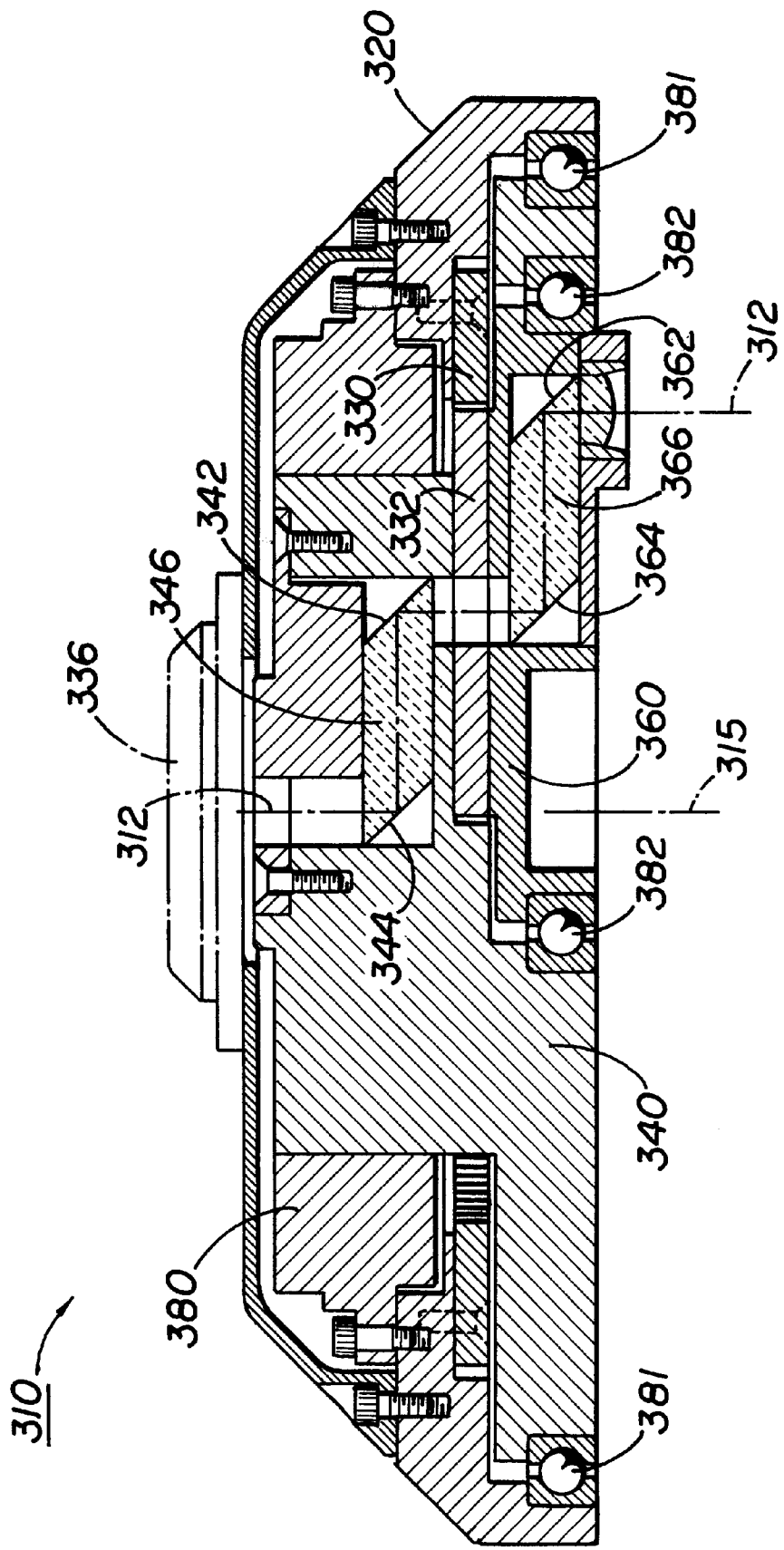
FIG. 5 is a cross-sectional view of one embodiment of the invention.

FIGS. 4 and 5 show an optical image scanner 310 embodiment of the invention for scanning an optical beam along a linear path 316 on an object 318. The scanner 310 has a housing 320 with a top 326 and an opposite bottom 328. The housing 320 defines a first cylindrical cavity 322 between the top 326 and the bottom 328. A ring gear 330, is disposed within the cylindrical cavity 322 and is affixed to the housing 320. A device 336 for generating an optical beam 312 along an axis 315 is fixed to the housing 320. Such a device 336 could comprise an OPU (which can both generate a beam and sense a beam reflected back from an object), of the type commonly known to the art of CD ROM design.

A drive disk 340 is disposed within the first cylindrical cavity 322 and defines a second cylindrical cavity 348. The drive disk 340 defines a first optical channel 346, that is rotatable about axis 315, in communication with a first proximal opening 352 and a first distal opening 354. The drive disk 340 also has a peripheral edge 356. A scan disk 360 is disposed within the second cylindrical cavity 348 and defines a second optical channel 366 in communication with a second proximal opening 372 in alignment with the first distal opening 354. The scan disk 340 also defines a second distal opening 374 in communication with the second optical channel 366. The drive disk 340 and the scan disk 360 are joined by relatively large diameter bearings 382. The drive disk 340 is joined to the housing 320 by a bearing 381.

As shown in FIG. 5, a ring motor 380 (such as a direct drive DC ring motor) is coupled to the peripheral edge 356 so as to cause the drive disk 340 to rotate. As would be known to one skilled in the art, other means may be used to rotate the drive disk 340, such as pulleys, drive belts, or gears connected to an external motor (not shown). As shown in FIGS. 4 and 5, a spur gear 332 is circumferentially affixed to the scan disk 360 and is engaged with the ring gear 330 so that as the ring motor 380 causes the drive disk 340 to rotate, the spur gear 332 is displaced along the ring gear 330, thus causing the scan disk 360 to rotate in a direction opposite the direction that the drive disk 340 is rotating. Thus, as the first optical channel 346 rotates in one direction and the second optical channel 366 rotates in an opposite direction, the second distal opening 374 to the second optical channel 366 linearly reciprocates, thereby causing the beam 312 to scan along the linear path 316 on the object 318.

The beam-generating device 336 causes the beam 312 to propagate along a first direction into the first proximal opening 352. A first mirror 344, or other beam-diverting device, as is known to the art, directs the beam 312 along a second direction, on a primary plane substantially perpendicular to the first direction, from the first proximal opening 352 into the first optical channel 346. A second mirror 342 (or other device) directs the beam 312 along a third direction, substantially parallel to the first direction, from the first optical channel 346 out of the first distal opening 354 and into the second proximal opening 372. A third mirror 364 (or other device) directs the beam 312 along a fourth direction, on a secondary plane substantially parallel to the primary plane, from the second proximal opening 372 into the second optical channel 366 and a fourth mirror 362 (or other device) directs the beam 312 along a fifth direction, substantially parallel to the first direction, from the second optical channel 366 out of the second distal opening 374 toward the linear path 316. The mirrors 342, 344, 362 and 364 are disposed so as to cause the beam 312 to change direction by 90 degrees.

This embodiment minimizes undesirable micrometer-scale motion. The second optical channel 366 must be positioned in such a way that the third mirror 364 is aligned with the second mirror 342 of the first optical channel 346 and it must rotate in a plane substantially parallel to the plane of rotation of the first optical channel 346. The drive disk 340 and the scan disk 360 must be carefully balanced to avoid undesirable vibration while rotating.

Counter rotation, in some applications, may be achieved by maintaining a roller in non-slipping contact with rings (not shown) having the same function and dimensions as the gears described above. To operate properly, a means must be provided which prevents slipping between the contacting surfaces. Another method of achieving the required counter-rotation is to drive each disk with separate synchronous motors. The motor rotation rates would be controlled so that each motor drives its associated disk at exactly the same speed, but in opposite direction.

Another approach to causing counter-rotation of the optical channels includes mechanically constraining the output from the joined channels to follow a straight line. This may be accomplished by attaching the end of the second optical channel to a sliding mechanism (not shown) which is constrained to move within a straight slot, along a rail, or a similar device. The first optical channel is rotated uniformly as described above, and as a result of the mechanical constraint, the second optical channel is forced to move in a way which exactly replicates the rotation previously discussed. In this way the desired linear motion is strictly enforced within the limits imposed by the elasticity, fit, and precision of the components. The rotational forces existing in the system are such that at the center of scan (rotational angle of 90 degrees), no force exists at the output of the second optical channel, and the system relies solely on the inertia of the second optical channel (developed during the earlier portion of the scan) to carry it through this singular point. As would be obvious, other means may be employed to carry through the singular point.

It is possible under certain conditions for this embodiment to lock up, or fail to follow a straight line. This may occur if the mechanism attempts to start with the two optical channels aligned exactly anti-parallel (with the output of the second periscope at the center of scan). In this case the output of the second optical channel simply rotates about the input axis to the first optical channel, and the scan degenerates from a straight line to a single point at the center of the data track. This condition may be prevented by controlling the optical channels so that they always stop with the optical channels in an orientation other than anti-parallel, or by providing a bias force by some other means such as a spring, or other element, one end of which is attached to the end of the second optical channel and the other end attached to the end of the slider tracks.

It will be readily appreciated that the invention could also be applied to many applications, such as image scanning where an image (e.g., photograph, painting, photographic negative or transparency, radiograph, written document, etc.) is scanned in raster fashion for the purpose of converting a two-dimensional representation of an object to a one-dimensional representation as occurs with electronic information transmission (e.g. television, facsimile). The invention may also be used when a serial data stream representing an object is transformed into a two-dimensional representation of the object by raster scanning (e.g., for use in a laser printer). Although the embodiments described herein employ an optical beam, the invention contemplates and anticipates embodiments wherein the beam comprises other beam-like phenomena, including beams or streams of photons, particles, fluid or non-optical electromagnetic radiation.

The above described embodiments are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

What is claimed is:

1. An apparatus for scanning a beam generated from a fixed location, comprising:
   a. a first channel having a first proximal end and an opposite first distal end, the first proximal end being in communication with the beam, the first proximal end being pivotally rotatable about a first axis of rotation adjacent the fixed location;
   b. a second channel having a second proximal end and an opposite second distal end, the second proximal end in communication with the first distal end of the first channel, the second proximal end being pivotally rotatable about a second axis of rotation offset from the first axis and adjacent the first distal end of the first channel;
   c. means for causing the first channel to rotate about the first axis in a first direction;
   d. means for causing the second channel to rotate about the second axis in a second direction opposite the first direction; and
   e. means for coupling the beam into the first channel, through the second channel and out of the second distal end of the second channel toward the object,
   whereby as the first channel rotates in the first direction and the second channel rotates in the second direction, the second distal end of the second channel reciprocates, thereby causing the beam to scan along a path on an object.

2. The apparatus of claim 1, further comprising means for generating the beam.

3. The apparatus of claim 2, wherein the beam generating means comprises an optical pick-up unit.

4. The apparatus of claim 1, wherein the beam is an optical beam.

5. The apparatus of claim 1, wherein the second distal end of the second channel reciprocates linearly.

6. The apparatus of claim 1, further comprising means for sensing a portion of the beam reflected from the object.

7. The apparatus of claim 1, wherein the first channel has a first length and the second channel has a second length, and wherein the first length is substantially equal to the second length.

8. The apparatus of claim 1, wherein the first channel rotates at a first rotational speed and the second channel rotates at a second rotational speed, and wherein the magnitude of the first rotational speed is substantially equal to the magnitude of the second rotational speed.

9. The apparatus of claim 1, further comprising:
   a. a housing having a top and an opposite bottom, the housing defining a first cylindrical cavity between the top and the bottom;
   b. a ring gear disposed within the cylindrical cavity and affixed to the housing;
   c. a drive disk, in which the first channel is embedded, disposed within the first cylindrical cavity and defining a second cylindrical cavity, the drive disk rotatable about the first axis of rotation;
   d. a scan disk, in which the second channel is embedded, disposed within the second cylindrical cavity, the scan disk being rotatable about the second axis of rotation; and
   e. a spur gear affixed to the scan disk and engaged with the ring gear wherein the first channel rotating means causes the drive disk to rotate in the first direction, so as to cause the spur gear to be displaced along the ring gear thereby causing the scan disk to rotate in the second direction.

10. The apparatus of claim 9, wherein the drive disk has a peripheral edge and the first rotating means comprises a ring motor coupled to the peripheral edge.

11. The apparatus of claim 10, wherein the ring motor is a direct drive DC ring motor.

12. The apparatus of claim 1, wherein the beam propagates along a first direction from the fixed location toward the first proximal end of the first channel, and wherein the coupling means comprises:

a. means for directing the beam along a second direction on a primary plane substantially perpendicular to the first direction, into the first channel via the first proximal end of the first channel;

b. means for directing the beam along a third direction, substantially parallel to the first direction, out of the first distal end of the first channel toward the second proximal end of the second channel;

c. means for directing the beam along a fourth direction on a secondary plane substantially parallel to the primary plane, into the second channel via the second proximal end of the second channel; and d. means for directing the beam along a fifth direction, substantially parallel to the first direction, out of the second distal end of the second channel toward the object.

13. The apparatus of claim 12, wherein each of the directing means comprises a mirror.

14. The apparatus of claim 13, wherein each mirror is disposed adjacent each end of the first channel and each end of the second channel at an angle from the first direction so as to cause the beam to change direction by 90 degrees.

15. The apparatus of claim 12, further comprising:

a. a first lens disposed adjacent the first proximal end of the first channel for collimating the beam into the first channel; and b. a second lens disposed adjacent the second distal end of the second channel for focusing the beam on the object.

16. The apparatus of claim 12, further comprising at least one relay lens disposed between the first distal end of the first channel and the second proximal end of the second channel.

17. An optical image scanner for scanning an optical beam along a linear path on an object, comprising:

a. a housing having a top and an opposite bottom, the housing defining a first cylindrical cavity between the top and the bottom, a ring gear disposed within the cylindrical cavity and affixed to the housing;

b. means for generating an optical beam from a fixed location relative to the housing;

c. a drive disk, disposed within the first cylindrical cavity and defining a second cylindrical cavity, the drive disk having a first axis of rotation, and defining a first optical channel having a first length, a first proximal end and a first distal end, the drive disk defining a first proximal opening adjacent the first proximal end of the first optical channel through which the first optical channel is in optical communication with the optical beam, the drive disk also defining a first distal opening, adjacent the first distal end of the first optical channel and in optical communication with the first optical channel, the first proximal end of the first optical channel pivotally rotatable about a first axis adjacent the fixed location, the drive disk also having a peripheral edge;

d. a scan disk, disposed within the second cylindrical cavity and having a second axis of rotation offset from the first axis of rotation, the scan disk defining a second optical channel having a second length substantially equal to the first length, a second proximal end and a second distal end, the scan disk defining a second proximal opening adjacent the second proximal end of the second optical channel through which the second optical channel is in optical communication with the first distal opening, the scan disk also defining a second distal opening, adjacent the second distal end of the second optical channel and in optical communication with the second optical channel, the second proximal end of the second optical channel pivotally rotatable about a second axis adjacent the first distal end of the first optical channel;

e. a ring motor coupled to the peripheral edge for causing the drive disk to rotate about the first axis of rotation in a first direction at a first rotational speed;

f. a spur gear circumferentially affixed to the scan disk and engaged with the ring gear so that as the ring motor causes the drive disk to rotate in the first direction, the spur gear is displaced along the ring gear thus causing the scan disk to rotate about the second axis in a second direction opposite the first direction at a second rotational speed substantially equal to the first rotational speed; and g. means for optically coupling the beam from the generating means through the first optical channel and the second optical channel and out of the second distal opening toward the linear path, so that as the first optical channel rotates in the first direction and the second optical channel rotates in the second direction, the second distal end of the second optical channel linearly reciprocates, thereby causing the beam to scan along the linear path on the object.

18. The apparatus of claim 17, further comprising means for sensing a portion of the beam reflected from the linear path.

19. The apparatus of claim 17, wherein the optical beam generating means comprises an optical pick-up unit.

20. The apparatus of claim 17, wherein the ring motor is a direct drive DC ring motor.

21. The apparatus of claim 17, wherein the optical beam generating means causes the beam to propagate along a first direction from the fixed location into the first proximal opening, and wherein the coupling means comprises:

a. means for directing the beam along a second direction, on a primary plane substantially perpendicular to the first direction, from the first proximal opening into the first optical channel;

b. means for directing the beam along a third direction, substantially parallel to the first direction, from the first optical channel out of the first distal opening and into the second proximal opening;

c. means for directing the beam along a fourth direction, on a secondary plane substantially parallel to the primary plane, from the second proximal opening into the second optical channel; and d. means for directing the beam along a fifth direction, substantially parallel to the first direction, from the second optical channel out of the second distal opening toward the linear path.

22. The apparatus of claim 21, wherein each of the directing means comprises a plurality of mirrors, wherein each mirror is disposed adjacent each end of the first optical channel and each end of the second optical channel at an angle from the first direction so as to cause the beam to change direction by 90 degrees.

23. The apparatus of claim 21, further comprising:
   a. a first lens disposed adjacent the first proximal opening of the drive disk for collimating the beam into the first optical channel; and
   b. a second lens disposed adjacent the second distal opening of the scan disk for focusing the beam on the linear path.

24. The apparatus of claim 21, further comprising at least one relay lens disposed between the first distal opening of the drive disk and the second proximal opening of the scan disk.

25. A method of scanning an optical beam along a linear path, comprising the steps of:
   a. continuously generating the optical beam from a fixed location and directing the beam toward a first proximal end of a first optical channel;
   b. re-directing the beam through the first optical channel, also having an opposite first distal end, so that the beam propagates from the first proximal end of the first optical channel toward the first distal end of the first optical channel;
   c. re-directing the beam from the first distal end of the first optical channel toward a second optical channel having a second proximal end adjacent the first distal end of the first optical channel and an opposite second distal end so that the beam propagates from the second proximal end of the second optical channel toward the second distal end of the second optical channel;
   d. causing the first optical channel to rotate about the first proximal end of the first optical channel in a first direction on a primary plane;
   e. causing the second optical channel to rotate about the second proximal end of the second optical channel in a second direction opposite the first direction on a secondary plane parallel to the primary plane; and
   f. re-directing the beam from the second distal end of the second optical channel toward the linear path;

so that as the first optical channel rotates in the first direction and the second optical channel rotates in the second direction, the beam linearly reciprocates, thereby causing the beam to scan along the linear path on the object.

* * * * *